(12) United States Patent
Chew

(10) Patent No.: US 8,996,760 B2
(45) Date of Patent: Mar. 31, 2015

(54) METHOD TO EMULATE MESSAGE SIGNALED INTERRUPTS WITH INTERRUPT DATA

(75) Inventor: Yen Hsiang Chew, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 13/976,222

(22) PCT Filed: Nov. 3, 2011

(86) PCT No.: PCT/US2011/059179
§ 371 (c)(1),
(2), (4) Date: Jun. 26, 2013

(87) PCT Pub. No.: WO2013/109233
PCT Pub. Date: Jul. 25, 2013

(65) Prior Publication Data
US 2014/0237144 A1 Aug. 21, 2014

(51) Int. Cl.
*G06F 3/00* (2006.01)
*G06F 5/00* (2006.01)
*G06F 13/24* (2006.01)
*G06F 9/48* (2006.01)
*G06F 9/54* (2006.01)

(52) U.S. Cl.
CPC .............. *G06F 13/24* (2013.01); *G06F 9/4812* (2013.01); *G06F 9/544* (2013.01)
USPC .............................................. 710/50; 710/48

(58) Field of Classification Search
USPC ...................................................... 710/50, 48
See application file for complete search history.

(56) References Cited

U.S. PATENT DOCUMENTS

| 2003/0182484 | A1 | 9/2003 | Gaur et al. | |
| 2004/0221066 | A1* | 11/2004 | Ganfield et al. | 709/250 |
| 2006/0047877 | A1* | 3/2006 | Winkler et al. | 710/260 |
| 2006/0259658 | A1* | 11/2006 | Connor et al. | 710/22 |
| 2007/0005858 | A1 | 1/2007 | Shah et al. | |
| 2010/0161864 | A1* | 6/2010 | Barde et al. | 710/260 |

OTHER PUBLICATIONS

PCT International Search Report for PCT Counterpart Application No. PCT/US2011/059179, 3 pgs., (Aug. 21, 2013).

(Continued)

*Primary Examiner* — Farley Abad
(74) *Attorney, Agent, or Firm* — Blakely, Sokoloff, Taylor & Zafman LLP

(57) ABSTRACT

Methods to emulate a message signaled interrupt (MSI) with interrupt data are described herein. An embodiment of the invention includes a memory decoder to monitor a predetermined memory block allocated to a device, an interrupt controller to receive an emulated messaged signaled interrupt (MSI) signal from the memory decoder in response to a posted write transaction to the predetermined memory block initiated from the device, and an execution unit to execute an interrupt service routine (ISR) associated with the device to service the MSI using interrupt data retrieved from the predetermined memory block, without having to obtain the interrupt data from the device via an input output (IO) transaction.

20 Claims, 10 Drawing Sheets

(56) References Cited

OTHER PUBLICATIONS

PCT Written Opinion of the International Searching Authority for PCT Counterpart Application No. PCT/US2011/059179, 5 pgs., (Aug. 21, 2013).

PCT Notification concerning Transmittal of International Preliminary Report on Patentability (Chapter I of the Patent Cooperation Treaty) for PCT Counterpart Application No. PCT/US2011/059179, 7 pgs., (May 15, 2014).

* cited by examiner

METHOD TO EMULATE MESSAGE SIGNALED INTERRUPTS WITH INTERRUPT DATA

CROSS-REFERENCE TO RELATED APPLICATION

This patent application is a U.S. National Phase Application under 35 U.S.C. §371 of International Application No. PCT/US2011/059179, filed Nov. 3, 2011, entitled METHOD TO EMULATE MESSAGE SIGNALED INTERRUPTS WITH INTERRUPT DATA.

FIELD OF THE INVENTION

Embodiments of the present invention relate generally to data processing systems. More particularly, embodiments of the invention relate to emulating message signaled interrupts.

BACKGROUND

Message signaled interrupts (MSI) are a feature that enables a device function to request service by writing a system-specified data value to a system-specified address using, for example, a memory write transaction. An MSI transaction enables a device function to request an interrupt service by sending the MSI transaction as an inbound memory write on its bus to the front-side bus (FSB) or the processor bus. Because an MSI transaction is generated in the form of a memory write, MSI transactions support transaction conditions such as a retry, master-abort, target-abort or normal completion. As added benefits, MSI transactions simplify board design by removing out of band interrupt routing and represent another step towards a legacy-free environment.

Message signaled interrupts allow a device to write a small amount of data to a special address in memory space. The chipset will deliver the corresponding interrupt to a processor (also referred to as a central processing unit or CPU). A common misconception with message signaled interrupts is that they allow the device to send data to the CPU as part of the interrupt. The data that is sent as part of the write is used by the chipset to determine which interrupt to trigger on which CPU; it is not available for the device to communicate additional information to the interrupt handler.

A drawback of MSI transactions is the latency involved with servicing an interrupt. For example, when a device requests an interrupt service using MSI, the device generates a MSI transaction including a system-specified message and a system-specified address. Once a processor receives the MSI transaction, the processor has to communicate with the requesting device to retrieve data required to service the interrupt. The processor may then service the interrupt using interrupt data received from the device. However, the latency involved with communications with the device may be relatively long. As a result, each interrupt serviced via a MSI transaction involves a long latency and adds traffic to, for example, the FSB, the memory controller hub (MCH), and/or, the input-output controller hub (ICH) coupling the device to the processor.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
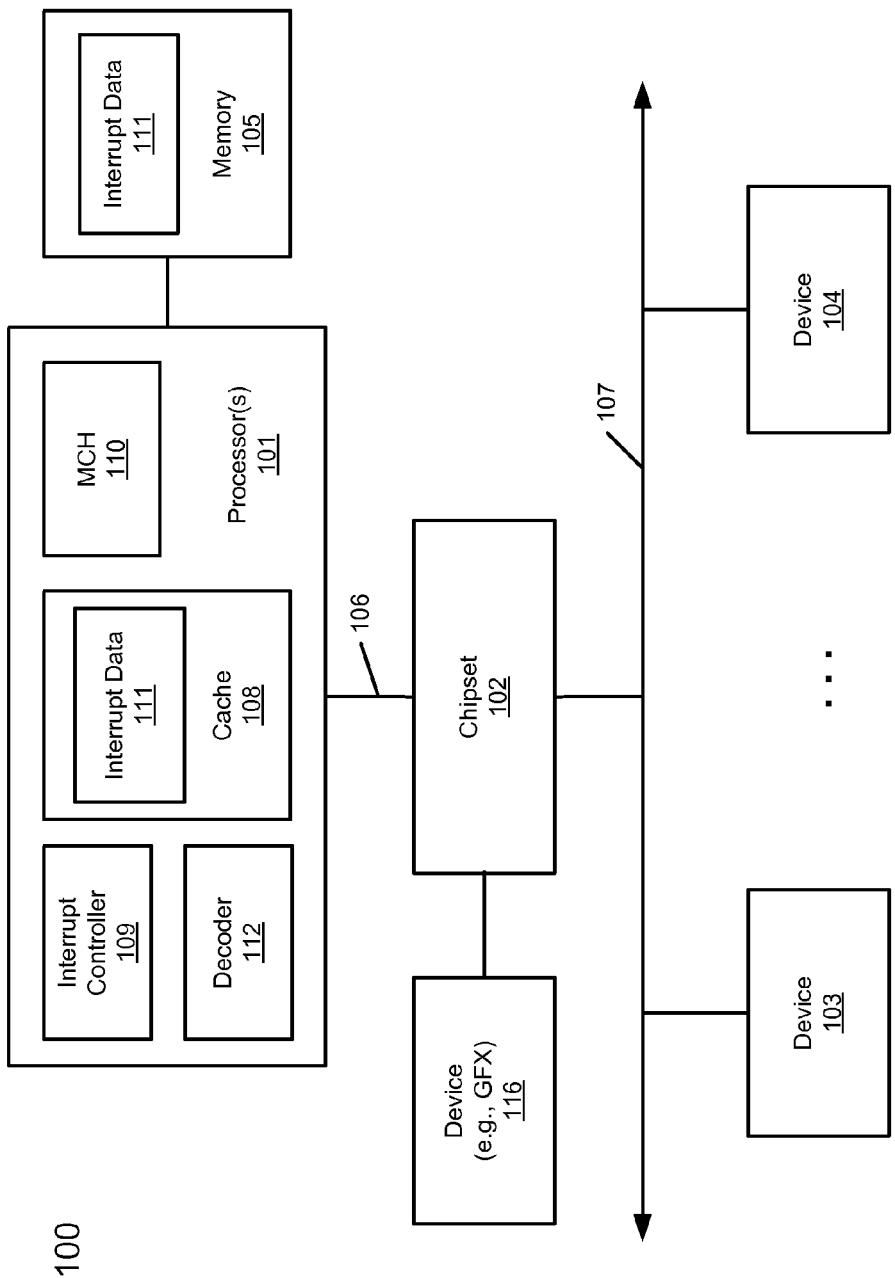
FIG. 1 is a block diagram illustrating an example of a system having improved MSI interrupt handling according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to allow a device to request an MSI interrupt by sending interrupt data or messages, including an interrupt vector, to processor directly to emulate an MSI interrupt, without having to send an actual MSI interrupt request to a system defined address for MSI. The interrupt data is not limited to the format or size required by a conventional MSI request. As a result, a device can send to the processor more data in a variety of formats than a regular MSI request would allow. Decoder logic associated with the processor or a chipset is configured to monitor and detect the emulated MSI request and to invoke an interrupt controller to issue an MSI interrupt based on the interrupt data.

According to one embodiment, for each device that is capable of handling MSI interrupts, a specific block of memory is allocated for the device. Such a block of memory may be allocated from a processor cache (e.g., processor level-2 (L2) or level-3 (L3) cache) or from a specific memory region of a system memory coupled to the processor. Each device is able to directly access its associated block of memory, for example, via a posted write transaction (e.g., using direct cache or memory access techniques). The size of a memory block associated with a device may vary dependent upon the specific configuration or needs, which may be configurable during an initialization of the system or device.

According to one embodiment, when a device is about to assert an MSI, instead of sending a regular MSI request message to a system defined address for MSI, the device is configured to send and store all the necessary data (also referred to herein as interrupt data) to be utilized during the interrupt service to the associated memory block via a posted write transaction. The interrupt data also includes an interrupt vector associated with an interrupt service routine (ISR) of the device. In response to the posted write transaction, decoder logic is configured to invoke an interrupt controller, such as an advanced programmable interrupt controller (APIC), to retrieve the interrupt vector from the memory block. In one embodiment, an MSI interrupt is directly sent to processor and the interrupt vector of the MSI is intercepted by processor APIC. The decoder logic may assert a signal (e.g. toggling an internal data signaling line) to processor APIC to inform processor APIC of a pending emulated MSI interrupt. In one embodiment, the decoder logic is configured to: 1) obtain the interrupt vector from memory block and send the interrupt vector to processor APIC; and/or 2) pass the memory block address to processor APIC and processor APIC then fetches the interrupt vector from the memory block based on the received memory block address.

When the processor invokes an interrupt service routine (ISR) associated with the interrupt vector of a device, the processor can access the memory block specifically allocated to the device to retrieve the interrupt data and service the interrupt using the interrupt data without having to obtain the same data from the device via one or more IO transactions, which may take a relatively long period of time.

According to a further embodiment, the interrupt data to be stored in the memory block may include multiple interrupt vectors, each being associated with an ISR or an entry point of an ISR. In response to detection of a posted write transaction to the memory block, decoder logic is configured to retrieve the interrupt vectors from the memory block. For each of the interrupt vectors, the decoder logic is configured to invoke the interrupt controller to access the interrupt vector from the memory block and invoke a processor or a processor core to execute an ISR associated with the interrupt vector. Such interrupt vectors may be associated with ISR routines that service multiple functions of a device or multiple devices. As a result, a single posted write transaction can request multiple MSI interrupts, including all the necessary interrupt data to be utilized during the associated interrupt services, without having to individually requesting multiple MSI interrupts to the system defined address for MSI.

FIG. 1 is a block diagram illustrating an example of a system having improved MSI interrupt handling according to one embodiment. Referring to FIG. 1, system 100 includes, but is not limited to, processor 101 coupled to chipset 102 via processor bus 106 (also referred to as a front side bus or FSB), where chipset 102 is coupled to one or more devices 103-104 via an IO bus or interconnect 107. Processor 101 may represent single or multiple processors with single or multiple processor cores. Processor 101 further includes MCH 110 to enable processor 101 or other devices such as devices 103-104 accessing memory 105 over a memory bus or interconnect. In one embodiment, processor 101 includes processor cache 108 having certain cache lines specifically allocated to devices 103-104 to store interrupt data 111. When interrupt controller 109 (also referred to as an interrupt handler or APIC) is to invoke an execution unit (not shown) of processor 101 to handle an interrupt such an MSI interrupt requested from a device, the execution unit can directly access the corresponding block of cache 108 associated with the device to retrieve interrupt data 111 of the device for the purpose of servicing the MSI interrupt, without having to obtain the same data from the device via one or more IO transactions (e.g., via chipset 102 and buses 106-107).

According to one embodiment, when a device such as device 103 or device 104 is about to assert an MSI, the device is configured to store interrupt data 111 to be utilized during the interrupt service to the associated block of cache 108 via a posted write transaction. Interrupt data 111 further includes an interrupt vector representing an entry point of an ISR associated with the device. Decoder logic 112 is configured to monitor and detect any posted write transaction to the allocated cache lines for the purpose of detecting emulated MSI interrupts initiated from devices 103-104. In some embodiments, decoder logic 112 may also reside in chipset 102 and coupled to MCH 110 for detecting writes to memory 105. In response to detection of such posted write transaction, decoder logic 112 retrieves or causes interrupt controller 109 to retrieve an interrupt vector from the allocated cache lines. Interrupt controller 109 then invoke processor 101 to service the interrupt associated with the interrupt vector. When processor 101 invokes an interrupt service routine (ISR) associated with the device based on the interrupt vector, processor 101 can access interrupt data 111 from the allocated cache lines associated with the device and service the interrupt using the interrupt data, without having to obtain the same interrupt data from the device via one or more IO transactions.

One of the reasons for specific cache lines to be allocated is to prevent interrupt data written to these allocated cache lines from being automatically replaced by the cache line replacement algorithm (e.g. least recently used (LRU) cache line replacement policy). For example, device 103 pushes interrupt data into cache line 312 to request an MSI interrupt. Processor 101 branches to device 103's ISR 306 and executes the ISR's callback function. When processor 101 services the interrupt (assuming that processor core 1 is servicing the interrupt), a second process from another processing core (core 2) accesses data from system memory 105 and encounters a cache miss, which causes the interrupt data contents of cache line 312 to be automatically replaced by data in system memory 105. This will cause ISR 306 to access the no longer valid interrupt data from cache line 312 and compromise the whole system. In addition, preallocating cache lines also prevents decoder logic 112 from erroneously invoking processor to service an interrupt when a write to the allocated cache line is triggered by an automatic cache line data replacement event instead of an actual emulated MSI interrupt posted write transaction to the allocated cache line from a device. In one embodiment, the allocated cache line is allocated by marking it unavailable for automatic replacement and it is allocated to a device (e.g. device 103) by writing its cache line or memory address into device 103's interrupt data register 308, such that device 103 is the only device that can write to that cache line.

Figure 2:
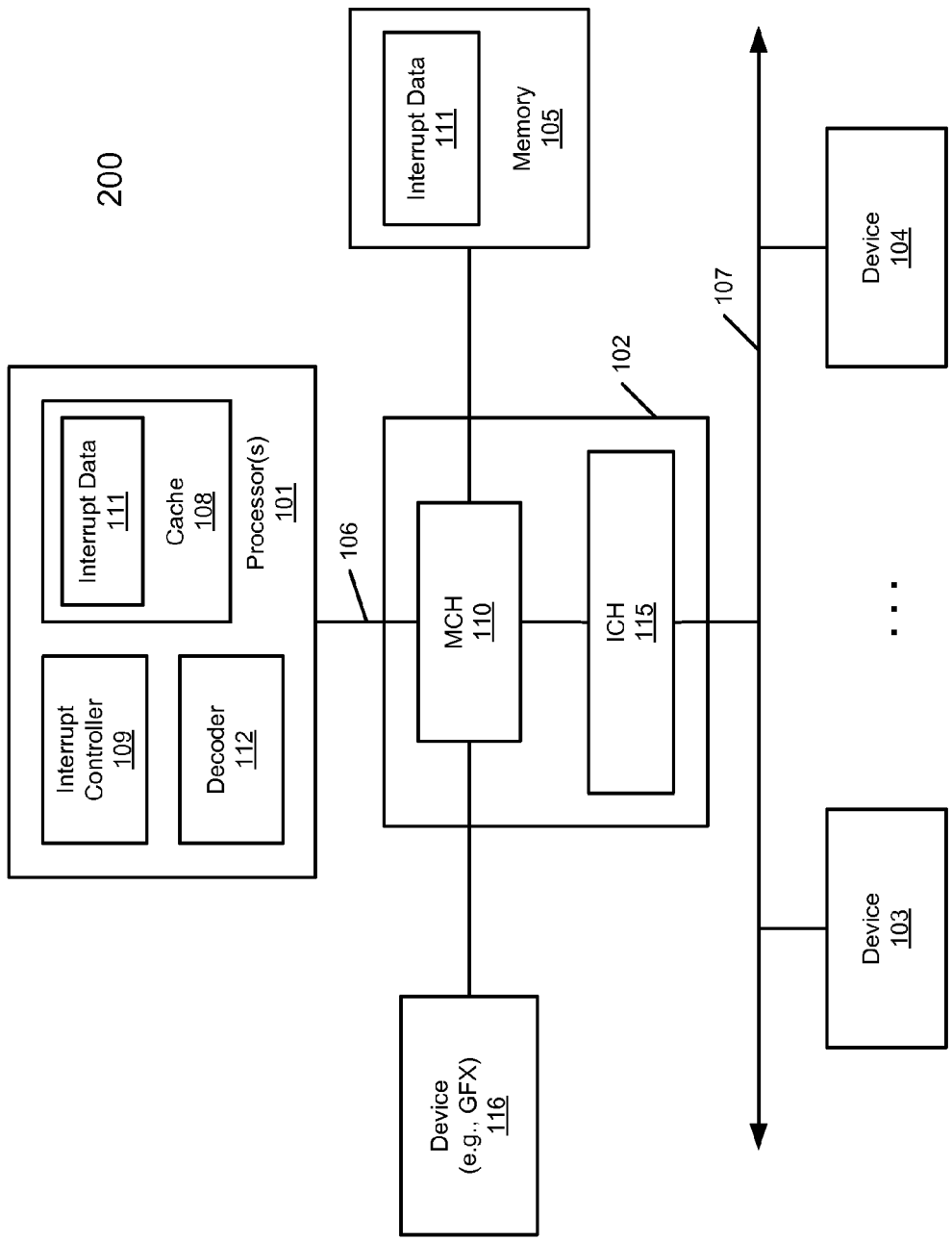
FIG. 2 is a block diagram illustrating an example of a system having improved MSI interrupt handling according to an alternative embodiment.

Note that the configuration as shown in FIG. 1 is described for the purpose of illustration only. The memory blocks allocated to store interrupt data 111 for devices 103-104 can also be allocated from other memories such as system memory 105 and accessible by processor 101 via MCH 110. Also note that MCH 110 may be integrated with chipset 102, where chipset 102 further includes input output controller hub (ICH) 115 to control IO devices such as devices 103-104, as shown in FIG. 2.

Figure 3:
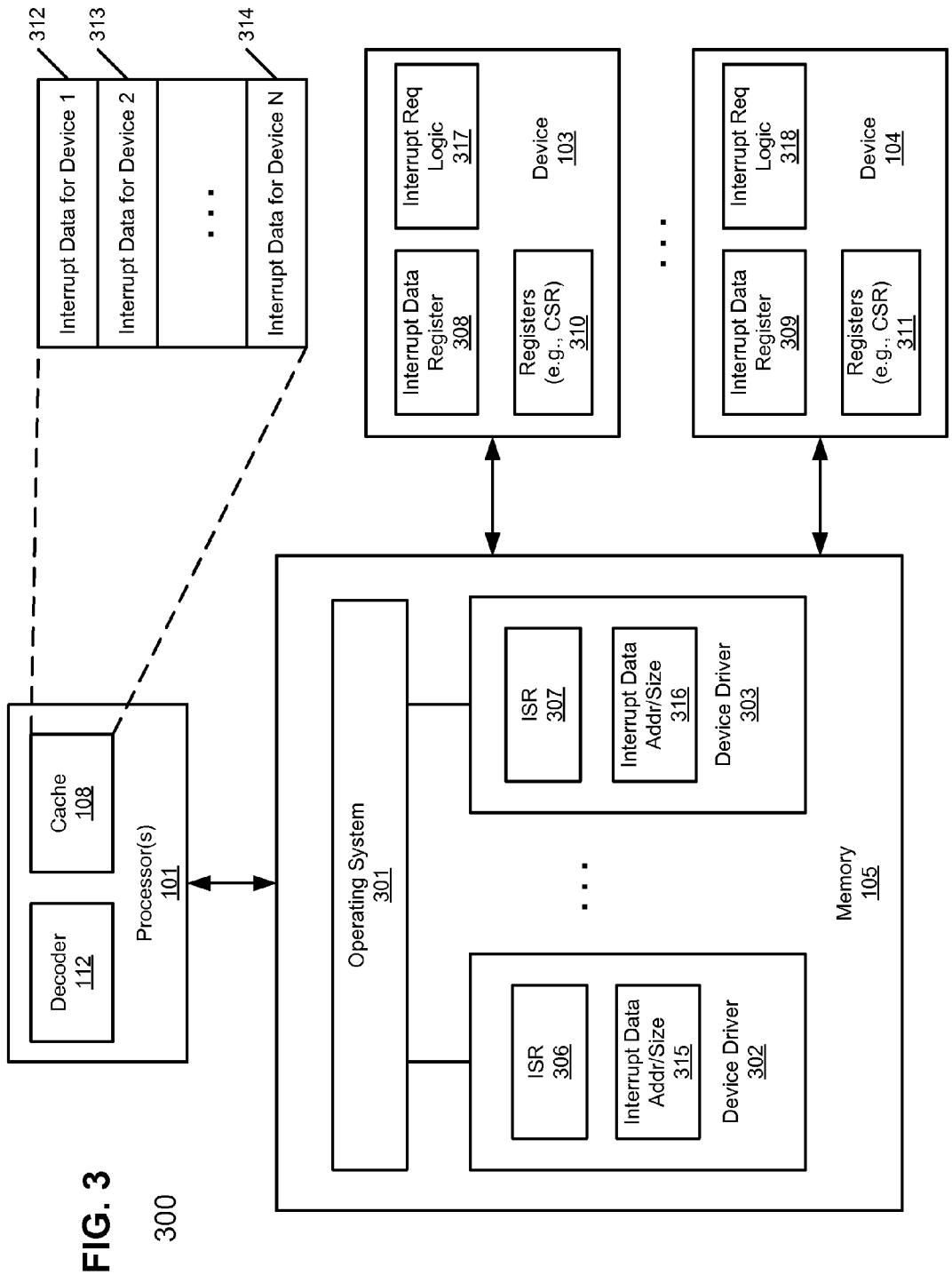
FIG. 3 is a block diagram illustrating an example of architecture of a data processing system according to one embodiment.

FIG. 3 is a block diagram illustrating an example of architecture of a data processing system according to one embodiment. System 300 may be implemented as a part of system 100 as shown in FIG. 1 or system 200 of FIG. 2. Referring to FIG. 3, system 300 includes various software components executed from memory 105 by processor 101 including, but are not limited to, operating system (OS) 301 and device drivers 302-303 for operating devices 103-104, respectively. OS 301 can be a variety of operating systems, such as Windows® from Microsoft, Mac OS®/iOS® from Apple, Android® from Google®, Linux® or Unix® operating system. OS 301 is configured to communicate with devices 103-104 via their respective device drivers 302-303 over a bus or interconnect.

When a device (e.g., device 103) wishes to request an MSI interrupt, the device is configured to issue a posted write transaction to a system defined address for MSI, including an interrupt vector representing an entry point of the associated ISR. The MSI request causes an interrupt controller to invoke processor 101 to call back the ISR (e.g., ISR 306) to service the interrupt. Conventionally, when the ISR is invoked, the processor has to access the corresponding device to retrieve the necessary interrupt data such as data of one or more registers (e.g., control and status register or CSR) of the device via one or more IO transactions, which may consume a relatively long period of time).

According to one embodiment, for each of devices 103-104, a dedicated block of memory is allocated to store interrupt data to be utilized by the corresponding ISR when an MSI interrupt is serviced by processor 101, where the interrupt data includes an interrupt vector associated with an MSI to be serviced. The memory block can be allocated from processor cache 108 or alternatively from a specific region of the system memory such as memory 105. Such memory blocks can be allocated during an initialization of system 300 (e.g., boot) or during initialization of device drivers 302-303. Alternatively, a memory block may be dynamically allocated when a device is connected with the system (e.g., detected by a plug-and-play manager).

For example, according to one embodiment, during initial enumeration of devices, the system firmware such as a basic input output system (BIOS), a boot loader or a low level OS initialization component can allocate and assign a block of memory to each device. For example, the system may directly configure or write a particular cache line address and/or size, or memory address and/or size associated with the corresponding memory block of each device in a predetermined register of the device (e.g., registers 308-309). The system may allocate a fixed size memory block for each device such as memory blocks 312-314. For example, during system initialization, the system may allocate and write a memory address and/or size of the allocated block to a predetermined register such as interrupt data registers 308-309 of devices 103-104, respectively. Subsequently, when device drivers 302-303 are loaded and initialized by OS 301, each of devices 103-104 can retrieve the cache line address or memory address from its interrupt data register (e.g., registers 308-309) and directly access the associated memory block (e.g., memory blocks 312-314) for the purpose of storing the interrupt data, for example, via a direct cache access (DCA) or direct memory access (DMA) method when it wants to send an MSI interrupt to processor 101. Similarly, during system initialization, OS 301 may also write the same memory address and/or size of the allocated memory block previously allocated to device 102-103 to a device driver 302-303 interrupt data parameter (e.g., interrupt data address/size 315-316) for the purpose of accessing device interrupt data from the same memory block during ISR interrupt service processing.

In a particular embodiment, during initialization, OS 301 allocates a cache line (e.g., cache lines 312-314) and writes the memory addresses to both the device driver interrupt data register (e.g., registers 308-309) and also a device driver interrupt data parameter (e.g. interrupt data address/size 315-316). For the purpose of illustration, when device 103 wishes to interrupt processor 101. Device 103 proactively sends its interrupt data including an interrupt vector as a posted write transaction into cache line 312 via DCA using the memory address previously stored in its interrupt data register 308, which may be detected by decoder logic 112. In response to the detection, decoder logic 112 transmits an emulated MSI signal to an interrupt controller 109. In response to the emulated MSI signal, interrupt controller 109 is configured to access the interrupt vector from cache line 312 and trigger processor 101 to branch to device driver's ISR 306 associated with the interrupt vector. When ISR 306 is invoked, processor 101 obtains device 103's interrupt data using the cache line address pointed to by device driver interrupt data parameter 315 and uses the interrupt data to process the interrupt. Storing the same cache line or memory address to both device data register 308 and an interrupt data parameter 315 inside device driver 302 during initialization enables device 103 and processor 101 executing device driver 302 (e.g., two separate entities) to know where to send and retrieve interrupt data (including interrupt vector(s)) without having to query each other.

Alternatively, according to another embodiment, when a device driver is loaded and initialized by OS 301, the device is configured to communicate with OS 301 or the BIOS to request a block of memory (from processor cache or system memory) with a particular size. For example, a device driver can call a specific application programming interface (API) to BIOS or OS 301 to negotiate a block of memory either from processor cache 108 or system memory 105. In return, the system allocates and provides a starting memory address and/or size to the device driver, which may be maintained (in memory 105) by the device driver throughout the life of the device driver or alternatively, it can be written in a register of the device (e.g., interrupt data registers 308-309). As a result, each device driver has the capability of negotiating various sizes of memory blocks for storing interrupt data, which is not limited to traditional MSI request messages.

For the purpose of illustration only, it is assumed that device driver 302 is configured to control and operate device 103 and memory block 312 has been allocated to device 103 for storing interrupt data. When an interrupt event of device 103 occurs, device 103 is configured to store the associated interrupt data to memory block 312. Note that an interrupt requester of a driver is invoked only once during device configuration to reserve (request for) an MSI interrupt, which may include setting up the interrupt vector and linking it to the interrupt service routine callback function of the device and reserving a memory block for storing interrupt data. The device is the one that contains additional logic, firmware or software to proactively push its interrupt data including its own CSR values, filled DMA buffer addresses, device messages, tags and other information to processor cache or memory when it wishes to send an MSI interrupt to processor. When this is done, device driver 302's interrupt service routine no longer needs to poll the device for its interrupt data using multiple IO transactions. For example, when device 103 wishes to assert an MSI interrupt to processor 101, interrupt request logic 317, which may be implemented as a DCA/DMA logic or firmware, proactively pushes interrupt data of device 103 (e.g. CSR 310, DMA filled buffer addresses, interrupt messages, tags, etc.) into memory block 312 as a posted write transaction. The interrupt data further includes one or more interrupt vectors associated with the interrupt.

Once the interrupt data has been stored in memory block 312, decoder logic 112 detects such a transaction as decoder logic 112 constantly or periodically monitors the activities at the cache lines allocated to devices 103-104. In response to the detection, decoder logic 112 is configured to transmit an emulated MSI request signal to interrupt controller 109. In response to the emulated MSI request, interrupt controller 109 causes processor 101 to branch to its interrupt handler and calls ISR 306 of device driver 302. In this embodiment, decoder logic 112 may retrieve the interrupt vector from interrupt data 111 and hands the interrupt vector to interrupt controller 109. Alternatively, decoder logic 112 informs interrupt controller 109 an MSI interrupt request signal and a particular cache line to retrieve the interrupt vector for the MSI interrupt request, and interrupt controller 109 then retrieve the interrupt vector from the cache line to trigger processor 101 to branch to ISR 306 which is associated with the interrupt vector.

When ISR 306 is invoked, processor 101 is configured to access memory block 312 to retrieve the interrupt data stored therein based on the memory address associated with the allocated memory block and to service the MSI interrupt using the retrieved interrupt data without having to access device 103 via one or more IO transactions. In this way, an embodiment of the invention provides an alternatively way to trigger an MSI interrupt without having the device to request an MSI interrupt by writing to a system defined address according to an MSI specification. In addition, an amount of interrupt data to be pushed to cache 108 is not limited to those defined in MSI messages. A device can push as much as information as part of interrupt data as it wants, as long as the device can negotiate enough space of cache 108 to store the same. Thus, a single posted write transaction to a predetermined memory block allocated can allow a device to request an MSI interrupt for the device, as well as push all the necessary interrupt data utilized during the corresponding interrupt service that would normally not fit in a conventional MSI request.

Note that the interrupt controller (e.g. processor APIC—Advanced Programmable Interrupt Controller) processes the interrupt vector associated with the MSI interrupt and causes processor 101 to branch to its interrupt handler. The interrupt handler will invoke ISR 306. Each device's MSI interrupt data includes a unique interrupt vector that is mapped to the device ISR. When decoder logic 112 detects that a posted write transaction is to certain cache lines allocated to a device, it passes the posted write transaction data (e.g., the interrupt vector) to the processor APIC. The processor APIC uses the interrupt vector to locate the interrupt handler which may reside in some specified memory address. The interrupt handler then invokes the device driver's ISR 306 callback function to service the interrupt. In this embodiment, ISR 306 obtains its interrupt data from memory 312 without having to poll device 103 using multiple IO transactions.

According to one embodiment, when device 103 wishes to request an MSI interrupt, interrupt request logic 317 of device 103 is configured to issue a posted write transaction to a preconfigured memory address corresponding to memory block 312 to a bus (e.g., IO bus and/or FSB) with all the necessary interrupt data included therein, including an interrupt vector. The memory address may be retrieved from interrupt data register 308 and also maintained by device driver 302. Once the interrupt data has been stored in memory block 312 and detected by decoder logic 112, decoder logic 112 is configured to transmit an emulated MSI request signal to an interrupt controller that may reside within processor 101 or within a chipset 102. The interrupt controller causes processor 101 to branch to ISR 306. While executing ISR 306, processor 101 is configured to access memory block 312 to retrieve interrupt data such as CSR information corresponding to CSR register 310, device specific messages, and other information as needed. Based on the information, processor 101 can determine the type of interrupt services requested by device 103, the state of device 103, and/or the statues of device 103; and service the requested interrupt using the retrieved interrupt data accordingly. After servicing the interrupt, processor 101 may update certain registers of device 103 via one or more IO or memory mapped IO transactions, notifying device 103 that the interrupt has been serviced. According to one embodiment, there may be multiple preconfigured memory addresses for intercepting emulated MSI interrupts. For example, a first device may write to a first memory address such as 0xA and a second device may write to a second memory address such as 0xB when any one of the first and second devices wants to issue an emulated MSI interrupt with interrupt data to processor.

Figure 4:
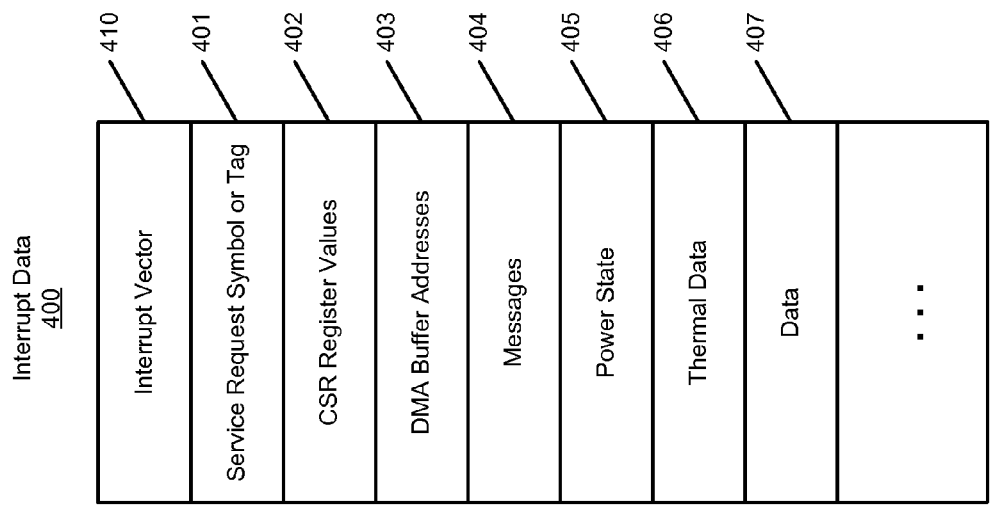
FIG. 4 is a block diagram illustrating a data structure to store interrupt data according to one embodiment.

Dependent upon the size of an allocated memory block, according to one embodiment, interrupt data can include a variety of information that can be utilized by ISR 306 when servicing the MSI interrupt. For example, as shown in FIG. 4, interrupt data 400 may include, but is not limited to, interrupt vector 410, service request symbol or tag 401, CSR register value 402, direct memory access (DMA) addresses 403, device specific messages 404, device power state information 405, device thermal data and thermal control information 406, and other data 407. Service request symbol or tag 401 may be utilized by an ISR to determine the type of service or function should be performed during the interrupt service (e.g., a filled DMA buffer to be processed; an error condition occurred and error recovery is needed; data available to be processed; or device ready to receive data, etc). Service request symbol or tag 401 may be internally defined by a device logic developer and/or device software developer specifically tailored to the device's needs. CSR register values 402 may be retrieved from one or more CSR register of the device and posted via the posted write transaction to memory block 312. Note that information 401-407 is shown for the purpose of illustration only; more or less of information 401-407 may be included dependent upon the specific configuration.

For example, interrupt data 400 may further include any device register values, first-in-first-out (FIFO) entries, queue entries, or any other device information can may otherwise be obtained using one or more IO transactions to query device registers during an ISR callback (after MSI interrupt has been received and processor execution has entered the ISR). Device power state information 405 may allow the device to proactively interrupt processor in response to a change in its power state or in response to a power state transition event. Device thermal data and thermal control information 406 may allow the device to proactively interrupt processor in response to a thermal event such as overheating or the need to turn on/turn off a fan or a cooling system. Other data information 407 may include some relatively "small size" interrupt data, such as keystrokes and/or coordinates information from a user input device such as a mouse, touchpad or keyboard, etc.

Figure 5:
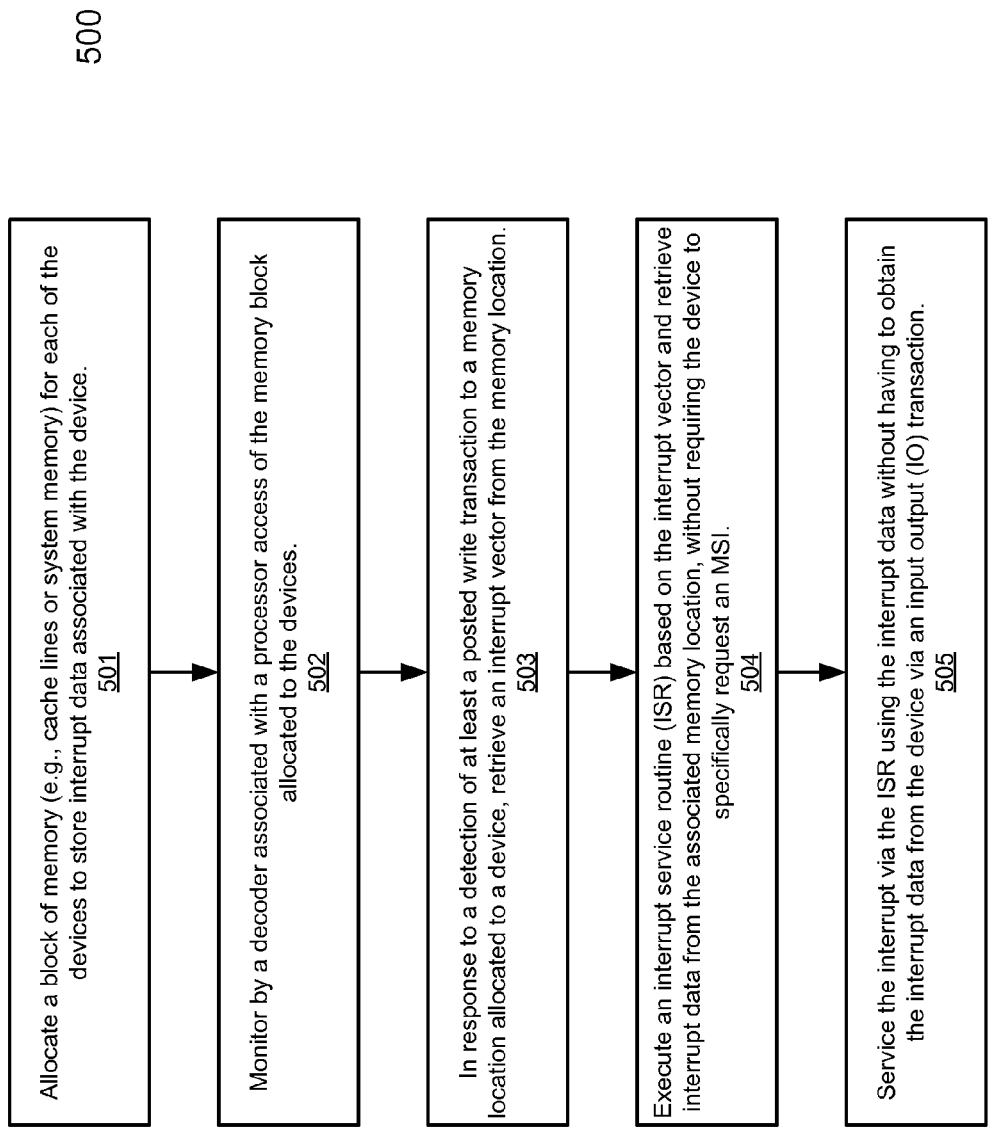
FIG. 5 is a flow diagram illustrating a method to emulate an MSI interrupt according to one embodiment.

FIG. 5 is a flow diagram illustrating a method to emulate an MSI interrupt with interrupt data according to one embodiment. Method 500 may be performed by system 100 or 200 as described above. Referring to FIG. 5, at block 501, processing logic allocates a block of memory (e.g., processor cache lines or system memory) for each of the devices to store interrupt data associated the device. The interrupt data may be stored by a device in its associated memory block via a posted write transaction. At block 502, processing logic such as decoder logic monitors the allocated memory block to detect whether any device has accessed the memory block for the purpose of requesting an MSI interrupt. In response to detection of accesses of the allocated memory block representing an MSI request, at block 503, an interrupt vector is retrieved from the memory block storing the interrupt data. At block 504, an ISR associated with the interrupt vector is invoked. In addition, interrupt data is retrieved from the memory block that is associated with the device. In one embodiment, the interrupt data may be stored based on a cache line address stored in a device driver interrupt data parameter entry. At block 505, the interrupt data is utilized to service the MSI interrupt without having to communicate with the device for the same data via an IO transaction. Thus, a single posted write transaction to a predetermined memory block allocated to a device can request an MSI interrupt for the device, as well as push all the necessary interrupt data utilized during the corresponding interrupt service that would normally not fit in a conventional MSI request.

Figure 6:
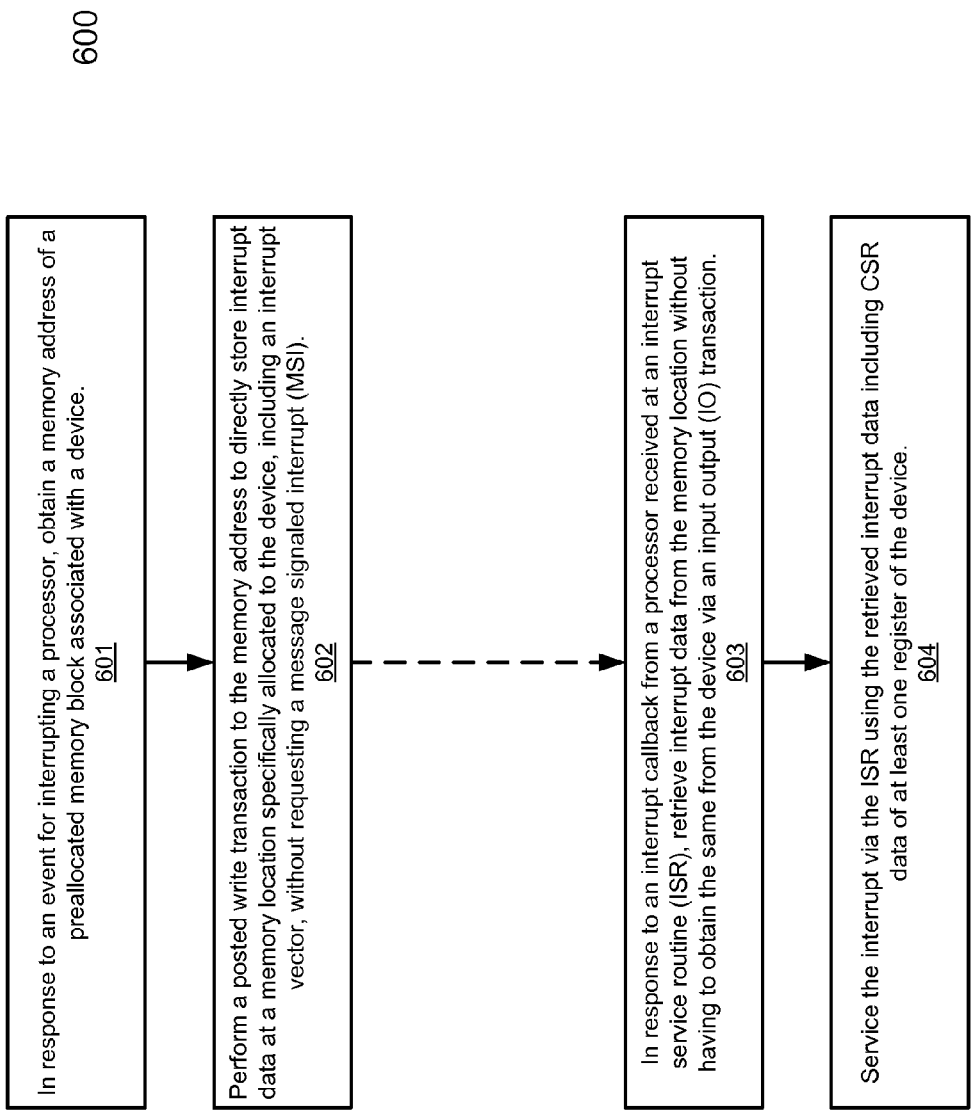
FIG. 6 is a flow diagram illustrating a method to emulate an MSI interrupt according to another embodiment.

FIG. 6 is a flow diagram illustrating a method to emulate an MSI interrupt according to another embodiment. Method 600 may be performed by a device and/or a device driver of FIG. 3. Referring to FIG. 6, at block 601, in response to an event for interrupting a processor, obtain a memory address of a pre-allocated memory block associated with the device. The memory block may be allocated from a processor cache of a processor or from the system memory, for example, during initialization of the system and/or the device. The memory address may be obtained from a predetermined register of the device, where the memory address was stored in the register previously (e.g., during initialization such as enumeration of the bus or devices). At block 602, processing logic issues a posted write transaction to the memory address to directly store interrupt data (e.g., interrupt data 400 of FIG. 4) at a memory location specifically allocated to the device. The interrupt data further includes an interrupt vector associated with an ISR of the device. Subsequently, in response to an interrupt callback from a processor received at an ISR, interrupt data is retrieved from the allocated memory block without having to obtain the same interrupt data from the device via an IO transaction. At block 604, the interrupt data is utilized to service the emulated MSI interrupt via the ISR. Note that operations of blocks 601-602 may be performed by interrupt request logic such as logics 317-318 of FIG. 3 while operations of blocks 603-604 may be performed by ISRs 306-307 of FIG. 3.

It can be seen that embodiments of the invention enable a device to proactively push certain information such as its CSR register values and other data into processor's cache or certain regions of the system memory when interrupting the processor for service using a single coalesced bus write transaction. The processor can have fast access to information it needs to service the interrupt and does not have to poll a register of the device via an IO transaction which can be inefficient and time consuming. It can also be seen that devices may selectively push only subsets of information needed by the processor to service the interrupt, for example, as shown in FIG. 4. It will be appreciated that a device designer may choose to use conventional methods of servicing an MSI interrupt, an improved MSI method as described above, or a combination of both methods. The choices of MSI processing methods may be selected dependent upon the complexity of the devices and/or the bandwidth or processing power available at the point in time (e.g., whether it is more efficient to "push" instead of "poll" under the circumstances). In one embodiment, multiple cache lines may be allocated to a device if the device needs additional space to store its interrupt data.

According to some embodiments, the interrupt data pushed by a device to the corresponding allocated memory block includes multiple interrupt vectors associated with multiple ISRs or multiple entry points of a single ISR associated with multiple devices or a single device. As a result, a single posted write transaction can request multiple MSI interrupts for one or more devices. For example, a device can request multiple MSI interrupts, one MSI interrupt for one of multiple functions associated with the device. Alternatively, an interrupt coalescing agent on the bus (e.g., a backbone bus) can intercept the MSI requests from multiple devices and combine multiple MSI interrupt requests of multiple devices and request multiple MSI interrupts via a single posted write transaction to a predetermined memory block other than the conventional MSI request address, including all the necessary interrupt data associated with the interrupt vectors. Devices that may want to perform interrupt coalescing may include network devices coupled to a common backbone bus or a device that processes multiple video streams. In response to a "combined" MSI interrupt request, the interrupt controller can assign the processing of different interrupt vectors to different processors or different processor cores. Conventional interrupt mechanisms are only able to send one interrupt vector at a time to the processor.

Figure 7:
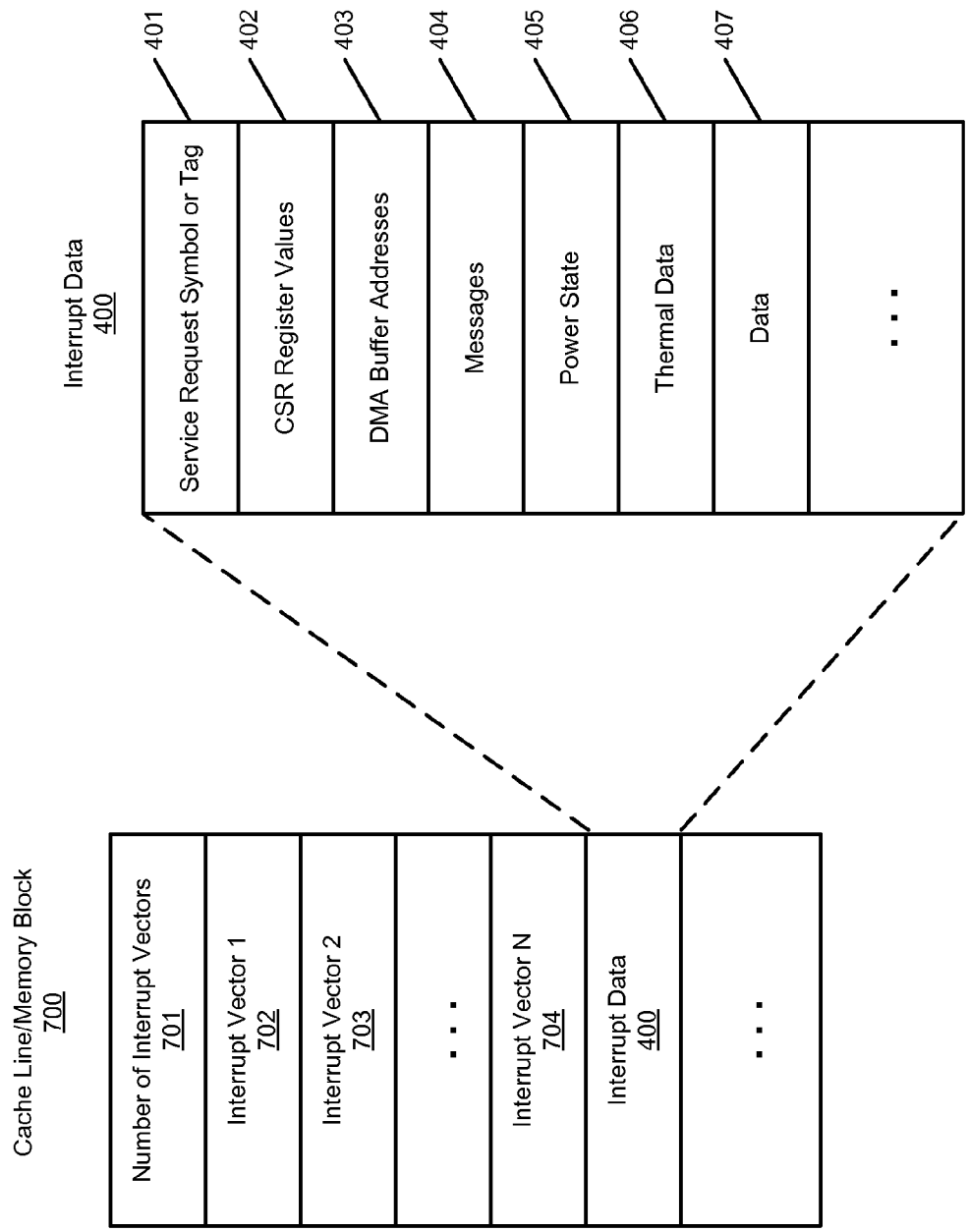
FIG. 7 is a block diagram illustrating a data structure storing interrupt data having multiple interrupt vectors according to one embodiment.

FIG. 7 is a block diagram illustrating a data structure storing interrupt data having multiple interrupt vectors according to one embodiment. Memory block 700 may represent any of memory blocks 312-314 of FIG. 3. Referring to FIG. 7, memory block 700 includes entry 701 to store information representing a number of interrupt vectors included therein and the actual interrupt vector entries 702-704. Memory block 700 further includes other interrupt data 400 which may be the same or similar to the one shown in FIG. 4. Note that interrupt data 400 may be shared with at least two of interrupt vectors 702-704 or alternatively, some of interrupt vectors 702-704 may have its own interrupt data which may be the same or similar to interrupt data 400. Interrupt data may also be different where additional interrupt data fields may be added (e.g. interrupt data 1 . . . interrupt data N), which may contain subfields similar to the ones described in FIG. 4. Also note that the data structure as shown in FIG. 7 is described for the purpose of illustration only; other formats may also be utilized.

Figure 8:
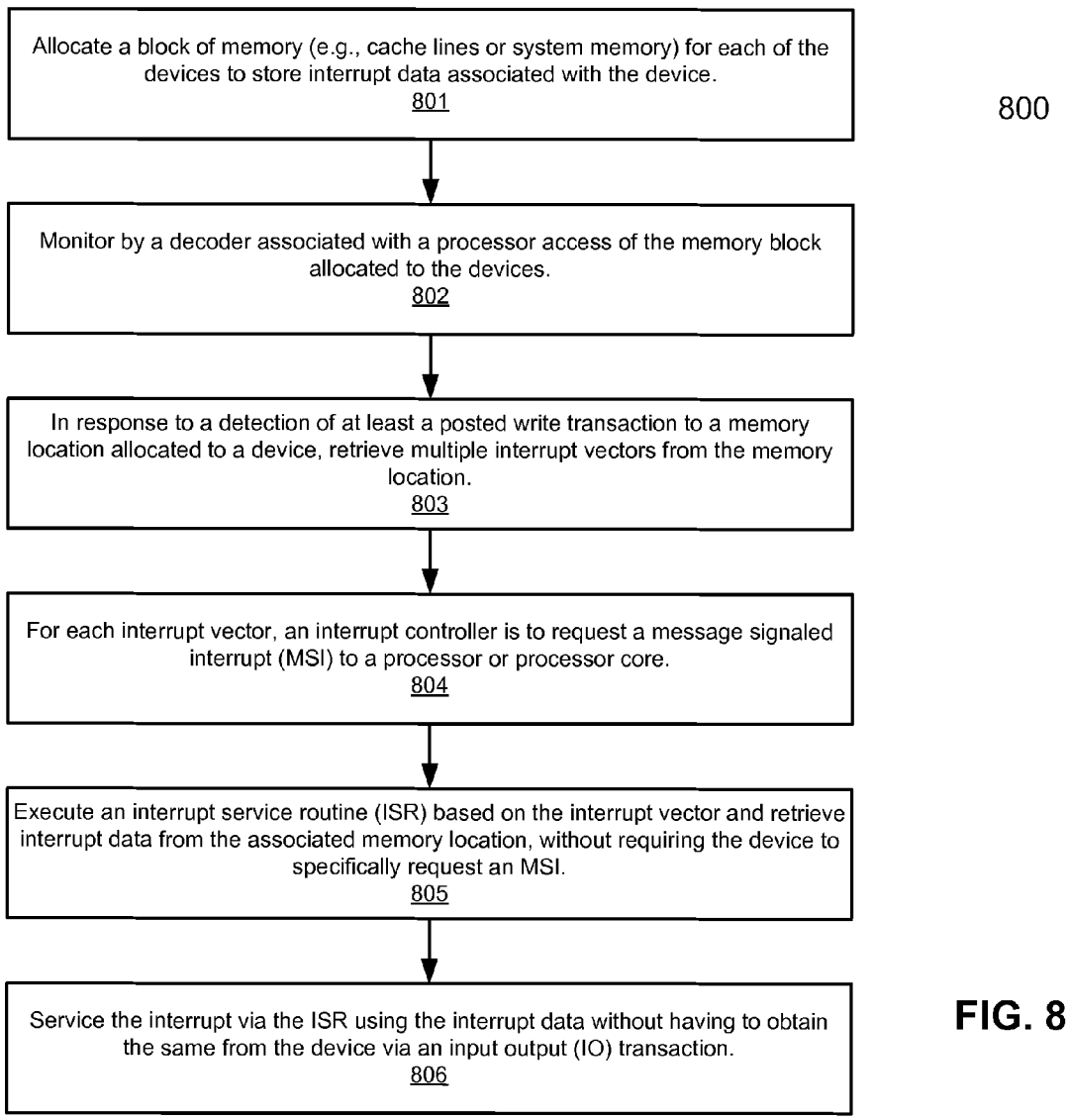
FIG. 8 is a flow diagram illustrating a method to emulate an MSI interrupt according to another embodiment.

FIG. 8 is a flow diagram illustrating a method to emulate an MSI interrupt with interrupt data according to another embodiment. Method 800 may be performed by system 100 or 200 as described above. Referring to FIG. 8, at block 801, processing logic allocates a block of memory (e.g., processor cache lines or system memory) for each of the devices to store interrupt data associated with the device. The interrupt data may be stored by a device in its associated memory block via a posted write transaction. At block 802, processing logic such as decoder logic monitors the allocated memory block to detect whether any device has accessed the memory block for the purpose of requesting an MSI interrupt. In response to detection of accesses of the allocated memory block representing an MSI request, at block 803, multiple interrupt vectors are retrieved from the memory block. At block 804, for each of the interrupt vectors, an interrupt controller is configured to assign to a processor or processor core the task of processing the interrupt vector which may including executing an ISR associated with the interrupt vector. At block 805, one or more ISRs are invoked to service the MSI interrupts, where additional interrupt data is also retrieved from the memory block to be utilized during the interrupt services at block 806.

Figure 9:
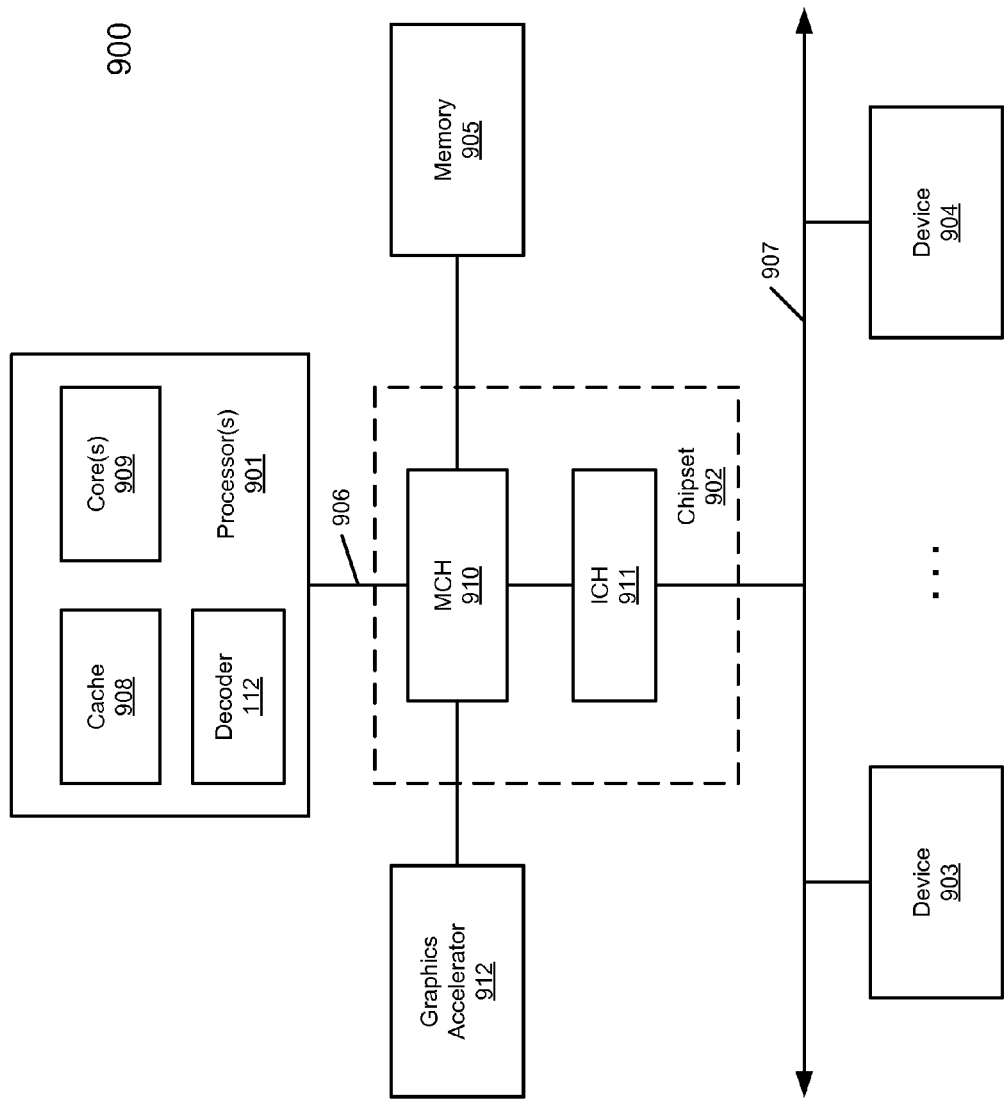
FIG. 9 is a block diagram illustrating an example of a data processing system according to one embodiment.

FIG. 9 is a block diagram illustrating an example of a data processing system according to one embodiment of the invention. For example, system 900 may represent any of systems 100 and 200 of FIGS. 1 and 2. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 9, in one embodiment, system 900 includes processor 901 and chipset 902 to couple various components to processor 901 including memory 905 and devices 903-904 via a bus or an interconnect 907. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, or the like. For example, processor 901 may be a Pentium™ 4, Pentium™ Dual-Core, Core™ 2 Duo and Quad, Xeon™, Itanium™, XScale™ or StrongARM™ microprocessor available from Intel Corporation of Santa Clara, Calif. Processor 901 is configured to execute instructions for performing the operations and steps discussed herein.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or other devices.

Figure 10:
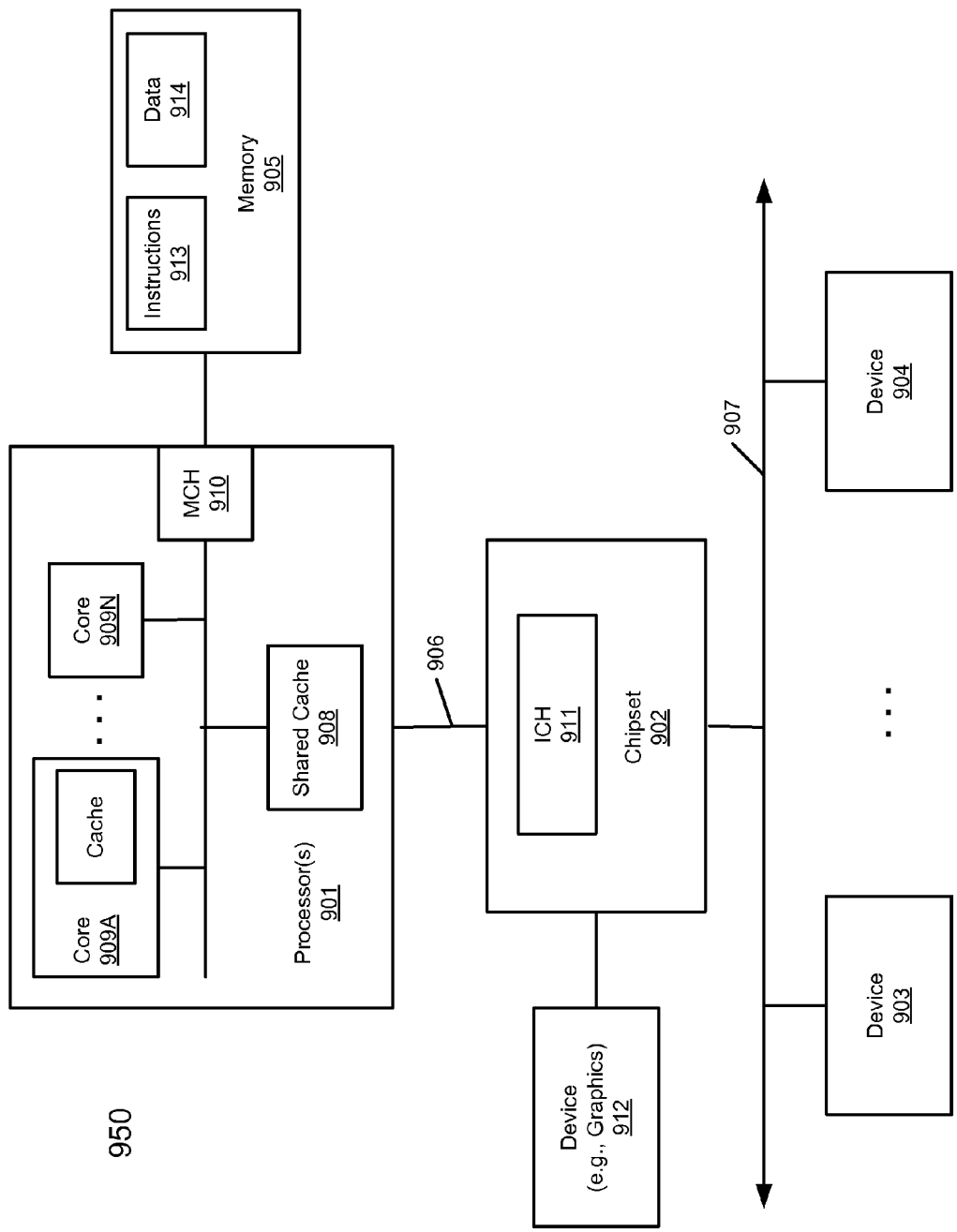
FIG. 10 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 10. Furthermore, graphics accelerator 912 may be integrated within MCH 910 or processor 901.

Memory 905 may store data including sequences of instructions that are executed by processor 901, or any other device. For example, executable code and/or data of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces.

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Processor 901 may further include a direct cache access (DCA) logic to enable other devices such as devices 903-904 to directly access cache 908. Processor 901 and/or chipset 902 may further include an interrupt controller to handle interrupts such as message signaled interrupts.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

According to one embodiment, a portion of process cache 908 and/or memory 905 is utilized to allocate a memory block for at least one of devices 903-904 to store interrupt data. When a device wishes to request an MSI interrupt, the device issues a posted write transaction to the memory block to store its interrupt data, including one or more interrupt vectors. Decoder logic 112 associated with processor 901 is configured to monitor the allocated memory block and in response to such detection, an interrupt controller is invoked to issue an emulated MSI interrupt with interrupt data based on the interrupt vector retrieved from the memory block. Thereafter, an ISR associated with the device is invoked to service the MSI interrupt using the interrupt data retrieved from the memory block, without having to communicate with the device via an IO transaction, as described above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
 a memory decoder to monitor a predetermined memory block allocated to a device in a memory accessible by the device, the memory decoder to detect a posted write transaction to the predetermined memory block by the device and to generate an emulated message signaled interrupt (MSI) signal for an MSI in response to poses write transaction;
 an interrupt controller to receive the emulated MSI signal from the memory decoder and in response to the emulated MSI signal, to obtain an interrupt vector from the predetermined memory bock, without receiving an MSI request from the device; and
 an execution unit to execute an interrupt service routine (ISR) associated with the interrupt vector to service the MSI using interrupt data retrieved from the predetermined memory block, without having to obtain the interrupt data from the device via an input output (IO) transaction.

2. The processor of claim 1, wherein the ISR is invoked based on an interrupt vector retrieved from the predetermined memory block rather than via an MSI request message.

3. The processor of claim 1, wherein the emulated MSI signal is generated based on the posted write transaction from the predetermined memory block other than a system defined address for the MSI.

4. The processor of claim 1, wherein the memory block is allocated from at least one of a cache memory associated with the execution unit and a system memory during initialization of the device.

5. The processor of claim 1, wherein the memory block is allocated from a processor cache associated with the execution unit, and wherein the interrupt data is stored in the memory block by the device via a direct cache access (DCA) transaction over a bus coupling the device to the processor.

6. The processor of claim 1, wherein the interrupt data comprises data of a device register, a control and status register (CSR) of the device representing an operating state of the device, a power state of the device and/or a thermal state of the device.

7. The processor of claim 1, wherein the interrupt data comprises data of a register, a first-in-first-out (FIFO), and/or a queue of the device representing a device control data, an address of a filled data buffer, an address of available device data for processing and/or an address of an available buffer to be filled.

8. A method, comprising:
 monitoring, by a memory decoder associated with a processor, a predetermined memory block allocated to a device in a memory accessible by the device, the memory decoder to detect a posted write transaction to the predetermined memory block by the device;
 generating an emulated message signaled interrupt (MSI) signal by the memory decoder for an MSI in response to a posted write transaction to the predetermined memory block initiated from the device;
 obtaining an interrupt vector from the predetermined memory block, without receiving an MSI request from the device; and
 invoking, by an interrupt controller, an interrupt service routine (ISR) associated with the interrupt vector to service the MSI using interrupt data retrieved from the predetermined memory block, without having to obtain the interrupt data from the device via an input output (IO) transaction.

9. The method of claim 8, wherein the ISR is invoked based on an interrupt vector retrieved from the predetermined memory block rather than via an MSI request message.

10. The method of claim 8, wherein the emulated MSI signal is generated based on the posted write transaction from the predetermined memory block other than a system defined address for the MSI.

11. The method of claim 8, wherein the memory block is allocated from at least one of a cache memory associated with the execution unit and a system memory during initialization of the device.

12. The method of claim 8, wherein the memory block is allocated from a processor cache associated with the execution unit, and wherein the interrupt data is stored in the memory block by the device via a direct cache access (DCA) transaction over a bus coupling the device to the processor.

13. The method of claim 8, wherein the interrupt data comprises data of a device register, a control and status register (CSR) of the device representing an operating state of the device, a power state of the device and/or a thermal state of the device.

14. The method of claim 8, wherein the interrupt data comprises data of a register, a first-in-first-out (FIFO), and/or a queue of the device representing a device control data, an address of a filled data buffer, an address of available device data for processing and/or an address of an available buffer to be filled.

15. A system, comprising:
a bus;
a device coupled to the bus;
a memory;
a memory decoder to monitor a predetermined memory block allocated to the device in a memory accessible by the device, the memory decoder to detect a posted write transaction to the predetermined memory block by the device and to generate an emulated message signaled interrupt (MSI) signal for an MSI in response to poses write transaction;
an interrupt controller to receive the emulated MSI signal from the memory decoder and in response to the emulated MSI signal, to obtain an interrupt vector from the predetermined memory bock, without receiving an MSI request from the device; and
an execution unit to execute an interrupt service routine (ISR) associated with the interrupt vector to service the MSI using interrupt data retrieved from the predetermined memory block, without having to obtain the interrupt data from the device via an input output (IO) transaction.

16. The system of claim 15, wherein the ISR is invoked based on an interrupt vector retrieved from the predetermined memory block rather than via an MSI request message.

17. The system of claim 15, wherein the emulated MSI signal is generated based on the posted write transaction from the predetermined memory block other than a system defined address for the MSI.

18. The system of claim 15, wherein the memory block is allocated from at least one of a cache memory associated with the execution unit and a system memory during initialization of the device.

19. The system of claim 15, wherein the memory block is allocated from a processor cache associated with the execution unit, and wherein the interrupt data is stored in the memory block by the device via a direct cache access (DCA) transaction over a bus coupling the device to the processor.

20. The system of claim 15, wherein the interrupt data comprises data of a device register, a control and status register (CSR) of the device representing an operating state of the device, a power state of the device and/or a thermal state of the device.

* * * * *